July 10, 1934.   J. M. RUSNAK   1,966,021
SUPPORT ELEVATING DEVICE FOR MACHINE TOOLS
Filed Feb. 15, 1933

INVENTOR
J. M. Rusnak
BY
Joseph K. Schofield
ATTORNEY

Patented July 10, 1934

1,966,021

UNITED STATES PATENT OFFICE 1,966,021

SUPPORT ELEVATING DEVICE FOR MACHINE TOOLS

John M. Rusnak, West Hartford, Conn., assignor to Pratt & Whitney Company, Hartford, Conn., a corporation of New Jersey Application February 15, 1933, Serial No. 656,950

5 Claims. (Cl. 90—58)

This invention relates to machine tools and particularly to means for elevating and lowering a work or tool supporting member upon a base or other part of the machine.

The principal objects of the present invention are to provide a simple, compact and easily operated device for adjusting the vertical position of a supporting member enabling maximum adjustment to be effected with a minimum number of parts.

One feature which enables me to accomplish the above-named objects is that rotating means are provided for one of a pair of alined threaded members such as nuts within which is freely rotatable an elongated screw so that by rotating the rotatable nut either this nut may rotate upon the screw while the screw remains fixed or the screw and nut may revolve together within the other or fixed nut.

Another object of the invention is to provide limiting means for the rotative movement of the screw within the fixed and rotatable nuts so that the screw cannot be threaded entirely out of either nut, further means being provided for preventing the two nuts becoming locked together upon the screw.

With the above and other objects in view, my invention includes the features of construction and operation set forth in the following specification and illustrated in the accompanying drawing.

In the accompanying drawing annexed hereto and forming a part of this specification, I have shown the invention embodied in an elevating means for the work support of a standard shaper or milling machine, but it will be understood that the invention may be otherwise embodied and that the drawing is not to be construed as defining or limiting the scope of the invention, the claims appended to this specification being relied upon for that purpose.

Figure 1:
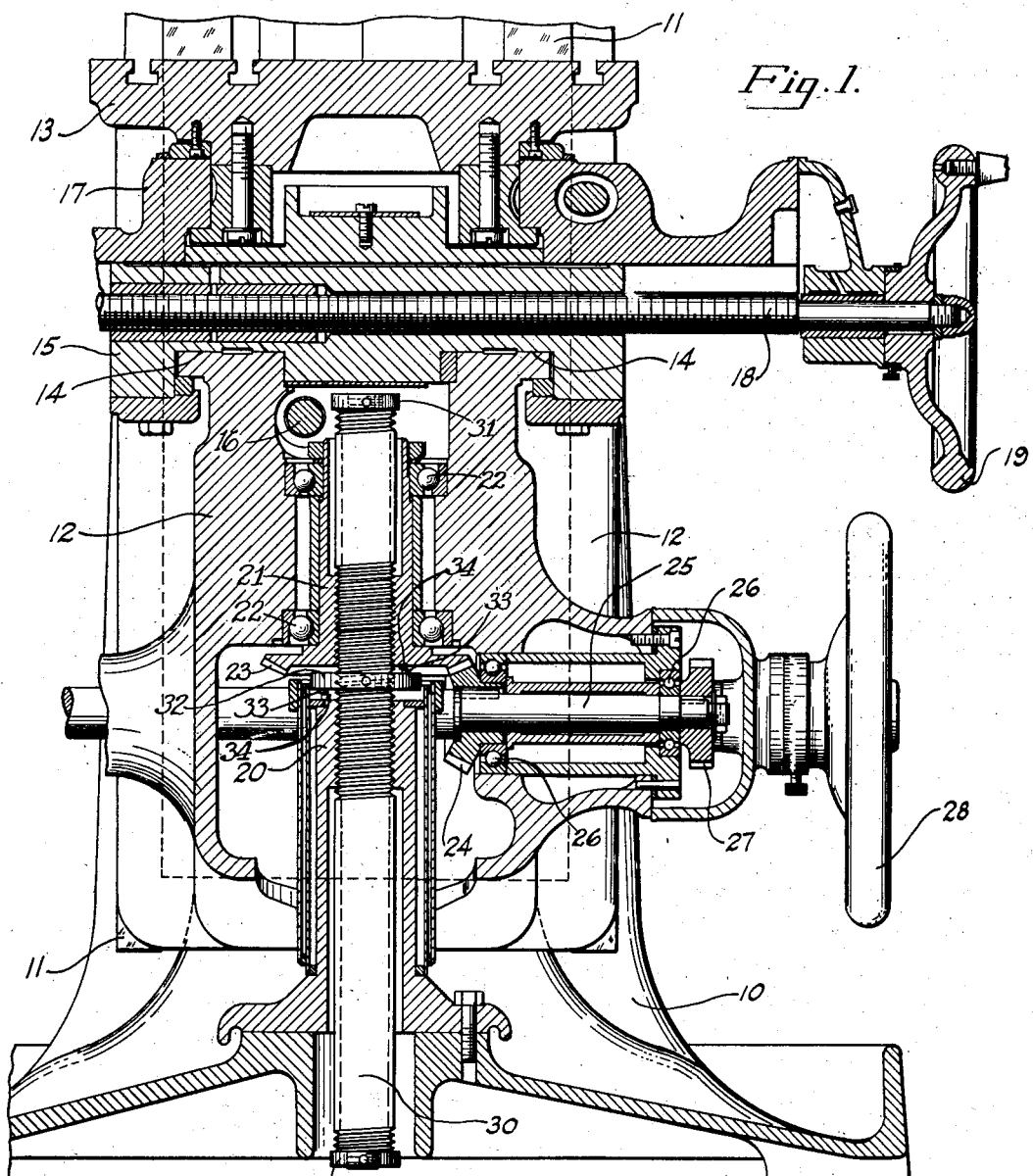
Figure 1 is a front vertical sectional view showing the elevating mechanism.
Figure 2:
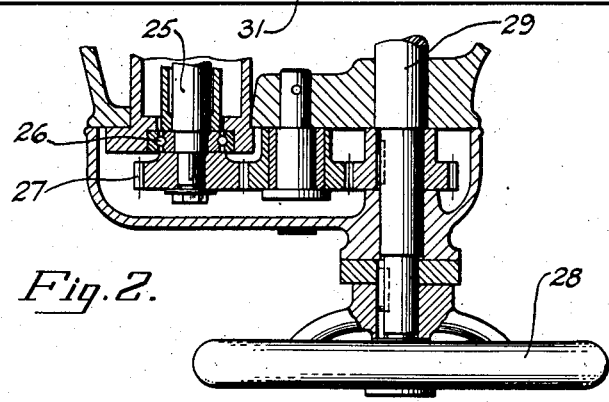
Fig. 2 is a fragmentary horizontal sectional view taken upon the plane of the shaft for operating the elevating screw.

In the above mentioned drawing I have shown but one embodiment of the invention which is now deemed preferable, but it is to be understood that changes and modifications may be made within the scope of the appended claims without departing from the spirit of the invention.

Briefly and in its preferred aspect, my invention may include the following principal parts: First, a base; second, a support such as a tool or work support slidably mounted upon suitable vertical ways on the base; third, a fixed nut within the base; fourth, a rotatable nut within the support alined with said fixed nut; fifth, an elongated screw engaging and extending between the nuts; sixth, rotating means for one of the nuts including a shaft extending to the side of the machine; seventh, a hand wheel and connecting means for manually rotating the nut; and eighth, collars upon the ends of and at an intermediate point of the elongated screw to limit the rotative movement of the screw within the respective nuts in opposite directions.

Referring more in detail to the figures of the drawing, at 10 I show the base and column portion of a machine tool such as a standard vertical shaper or universal milling machine having suitable vertical ways 11 upon which may slide the support 12 upon which may be mounted a suitable work clamping or rotating means 13. In the particular embodiment of the invention, the support 12 is provided with horizontal ways 14 within its upper portion engaged by a saddle member 15 which may be moved manually or otherwise by a suitable screw 16. Upon this saddle member 15 is a work table 17 transversely movable by means of a screw 18 and hand wheel 19 mounted within the saddle member 15. Above this table 17 may preferably be mounted the rotatable work table 13 which may be angularly adjusted by means of a worm and worm gear connection. As the above mentioned parts are well-known and usually found within machine tools of the type adapted for the present invention, further description is not thought to be necessary.

Mounted fixedly within an extended portion of the base or column 10 of the machine is a nut 20, the threaded portion of which is somewhat elevated with respect to the lower surfaces of the machine tool, the remaining portion of this nut 20 and a part of the base being recessed for a purpose presently to be described. Directly in alinement with this fixed nut 20 is a rotatably mounted nut 21 within the support 12. Preferably and as shown, this nut 21 may be mounted for rotation with minimum friction upon suitable anti-friction bearings 22. This nut 21 may have its threaded portion closely adjacent the fixed nut 20 within the base 10, the remaining portions being suitably recessed in the same manner as the fixed nut 20. Formed upon this nut 21, preferably integrally therewith as shown, is a bevel gear 23 which may mesh with a bevel pinion 24 upon the inner end of a shaft 25 extending laterally of the machine tool. This shaft, as shown, is rotatably mounted upon suitable anti-friction bearings 26 and may be rotated by means of a gear 27 upon its outer end. In order to effect manual rotation of this shaft 25 and consequently of the rotatably mounted nut 21, a hand wheel 28 is provided upon a suitable shaft 29 which is connected to the gear 27 on the transversely extending shaft 25 by suitable intermediate gearing.

Extending between the nuts 20 and 21 and threadedly engaging these nuts is an elongated screw 30. This screw 30 is mounted for free rotation upon the threads of nuts 20 and 21 so that by rotating the nut 21 within the support 12 as above described the nut 21 may rotate upon the screw 30 or the nut 21 and screw 30 may simultaneously rotate, the screw 30 rotating within the fixed or lower nut 20. In either case the effect of rotation of the nut 21 will be to elevate or lower the support 12.

In order to obtain maximum elevation and to eliminate the necessity of extending the screw 30 so that it would in the lower positions of the support extend below the floor line of the machine tool, the nuts 20 and 21 are recessed as above described. The screw 30 therefore is free to rotate within the nuts 20 and 21 until either or both ends of the screw are closely adjacent the outermost threaded portion of the nuts. To limit the screw 30 to this limiting rotative position and to prevent the screw becoming unthreaded, collars 31 may be secured upon the opposite ends. To prevent the two nuts 20 and 21 from becoming clamped together and to prevent the screw from assuming extreme upper or lower positions beyond the limits of the machine tool, a collar 32 is secured in fixed position to an intermediate point of the screw. It will be seen from Fig. 1 that with this collar 32 disposed as shown the screw 30 is prevented from contacting at its upper end against a portion of the saddle member 15 when the support 12 is in its lowermost position. Furthermore the screw 30 is prevented from extending to a position so that its lower end will extend below the floor line when the support 12 is in its lowermost position. Extending from opposite faces of the collar 32 are short pins or studs 33. Extending from the face of bevel gear 23 and the upper face of nut 20 are corresponding pins 34. Prior to either nut 20 or 21 contacting with a face of the collar 32 one of the pairs of pins 33—34 will come into contact, thus preventing further rotation of the screw 30 and the nut 20 or 21 carrying the pin.

What I claim is:

1. A support elevating device for machine tools comprising in combination, a base, a support movable vertically thereon, a fixed nut within said base, a rotatable nut within said support, an elongated screw freely rotatable within and extending between said nuts, and means to rotate said rotatable nut.

2. A support elevating device for machine tools comprising in combination, a base, a support movable vertically thereon, a fixed nut within said base, a nut rotatably mounted within said support but held in fixed axial position, an elongated screw freely rotatable within said nuts, and means to rotate said rotatable nut whereby said support may be raised or lowered.

3. A support elevating device for machine tools comprising in combination, a base, a support movable vertically thereon, a fixed nut in said base, a rotatable nut within said support, an elongated screw engaging within and extending between said nuts, means to limit the rotation of said screw within said nuts, and means to rotate said nut within the support.

4. A support elevating device for machine tools comprising in combination, a base, a support movable vertically thereon, a fixed nut in one of said members, a rotatably mounted nut in the other member, an elongated screw extending between and freely rotatable within said nuts, and means to rotate said rotatable nut.

5. A support elevating device for machine tools comprising in combination, a base, a support movable vertically thereon, a fixed nut in one of said members, a rotatably mounted nut in the other member, an elongated screw extending between and freely rotatable within said nuts, means to limit the rotation of said screw within said nuts in either direction of rotation, and manual means to rotate said rotatably mounted nut.

JOHN M. RUSNAK.